United States Patent [19]

Shanbhag et al.

[11] Patent Number: 5,004,616
[45] Date of Patent: * Apr. 2, 1991

[54] PROCESS FOR PREPARING MICROWAVE-REHEATABLE FRENCH FRIED POTATOES AND PRODUCT THEREOF

[75] Inventors: Sudhakar P. Shanbhag, Carlisle; Joseph J. Cousminer, Stoneham; Gerald Milani, Uxbridge, all of Mass.

[73] Assignee: Horizons International Foods, Inc., Burlington, Mass.

[*] Notice: The portion of the term of this patent subsequent to Jun. 5, 2007 has been disclaimed.

[21] Appl. No.: 483,598

[22] Filed: Feb. 22, 1990

Related U.S. Application Data

[63] Continuation-in-part of Ser. No. 248,854, Sep. 28, 1988, Pat. No. 4,931,296, which is a continuation-in-part of Ser. No. 193,370, May 12, 1988, abandoned.

[51] Int. Cl.$^5$ .............................................. A23L 1/217
[52] U.S. Cl. ...................................... 426/102; 426/241; 426/292; 426/296; 426/438; 426/441; 426/524; 426/637
[58] Field of Search ............... 426/241, 242, 243, 637, 426/438, 296, 524, 441, 102, 292; 62/62, 63, 64

[56] References Cited

U.S. PATENT DOCUMENTS

| | | |
|---|---|---|
| Re. 27,531 | 12/1972 | Murray et al. |
| 2,855,308 | 10/1958 | Buechel et al. .................. 426/438 |
| 2,906,620 | 9/1959 | Jung |
| 3,050,404 | 8/1962 | Traisman |
| 3,175,914 | 3/1965 | Vahlsing, Jr. |
| 3,359,123 | 12/1967 | Katucki ........................... 426/524 X |
| 3,368,363 | 2/1968 | Alaburda et al. ............... 426/524 X |
| 3,397,993 | 6/1968 | Strong |
| 3,404,989 | 10/1968 | Hirtesteiner ................... 426/524 X |
| 3,424,591 | 1/1969 | Gold |
| 3,532,509 | 10/1970 | Gronberg |
| 3,574,638 | 4/1971 | Nagel et al. |
| 3,594,188 | 7/1971 | Huxsoll et al. |
| 3,597,227 | 8/1971 | Murray et al. |
| 3,649,305 | 3/1972 | Wilder |
| 3,729,323 | 4/1973 | Nonaka et al. |
| 3,751,268 | 8/1973 | Van Patten et al. |
| 3,796,804 | 3/1974 | Ballentine ....................... 426/524 |
| 3,865,964 | 2/1975 | Kellermeier et al. ............ 426/307 |
| 3,881,028 | 4/1975 | Capossela et al. .............. 426/242 |
| 4,109,020 | 8/1978 | Gorfien et al. .................. 426/241 |
| 4,219,575 | 8/1980 | Saunders et al. ................ 426/242 |
| 4,254,153 | 3/1981 | Ross et al. ....................... 426/441 |
| 4,269,861 | 5/1981 | Caridis et al. .................. 426/438 |
| 4,272,553 | 6/1981 | Bengtsson et al. .............. 426/241 |
| 4,283,425 | 8/1981 | Yuan et al. ...................... 426/102 |
| 4,297,377 | 10/1981 | Harney et al. .................. 426/438 |
| 4,317,842 | 2/1982 | El-Hag et al. ................... 426/302 |
| 4,385,075 | 5/1983 | Brooks ............................ 426/524 |
| 4,447,459 | 5/1984 | Balboni et al. .................. 426/441 |
| 4,456,624 | 6/1984 | Glantz et al. .................... 426/96 |
| 4,511,583 | 4/1985 | Olson et al. ..................... 426/89 |
| 4,518,618 | 5/1985 | Hsia et al. ....................... 426/262 |
| 4,529,607 | 7/1985 | Lenchin et al. ................. 426/94 |
| 4,551,340 | 11/1985 | El-Hag et al. ................... 426/437 |
| 4,559,232 | 12/1985 | Glantz et al. .................... 426/96 |
| 4,579,743 | 4/1986 | Hullah ............................ 426/524 X |
| 4,590,080 | 5/1986 | Pinegar .......................... 426/441 |
| 4,632,838 | 12/1986 | Doenges ......................... 426/441 |
| 4,640,837 | 2/1987 | Coleman et al. ................ 426/94 |
| 4,751,093 | 6/1988 | Hong et al. ..................... 426/438 |
| 4,761,294 | 8/1988 | Hamann et al. ................. 426/438 |
| 4,931,296 | 6/1990 | Shanbhag et al. ............... 426/243 |
| 4,931,298 | 6/1990 | Shanbhag et al. ............... 426/296 |

FOREIGN PATENT DOCUMENTS

| | | |
|---|---|---|
| 900266 | 5/1972 | Canada ............................ 426/438 |
| 0006455 | 5/1979 | European Pat. Off. |
| 2919846 | 5/1980 | Fed. Rep. of Germany |
| 2078081 | 1/1981 | United Kingdom ............. 426/438 |

OTHER PUBLICATIONS

Food Technology, vol. 27, No. 3, 1973, pp. 50–55; M. Nonaka et al., "Texturizing Process Improves Quality of Baked French Fried Potatoes", Mar., 1973.

D. K. Tressler, "The Freezing Preservation of Foods", vol. 4—Freezing of precooked and prepared foods, AVI Publishing Co., pp. 220–221, Westport, CT., 1968.

Primary Examiner—Arthur L. Corbin
Attorney, Agent, or Firm—Kenyon & Kenyon

[57] ABSTRACT

A process for preparing improved french fried potatoes for subsequent reheating in a microwave oven is disclosed in which the potato strips are dust-coated with a thin layer of toasted potato granules and fat-encapsulated salt after frying in oil. In a preferred embodiment, potato strips are finish fried to a fully cooked, ready-to-eat condition and thereafter coated with a thin layer of toasted potato granules.

21 Claims, No Drawings

PROCESS FOR PREPARING MICROWAVE-REHEATABLE FRENCH FRIED POTATOES AND PRODUCT THEREOF

This is a continuation-in-part of U.S. application Ser. No. 248,854, filed Sept. 28, 1988, now U.S. Pat. No. 4,931,296, which is a continuation-in-part of U.S. Ser. No. 193,370, filed May 12, 1988, now abandoned.

FIELD OF THE INVENTION

The present invention relates to a process for producing a french fried potato product which upon reheating in a microwave oven closely resembles the size, shape, appearance, color, texture, taste, aroma, and total eating experience of french fried potato products which have been deep fat fried immediately prior to eating.

BACKGROUND OF THE INVENTION

The market for french fried potato strips, commonly referred to as french fries, is currently estimated at approximately 6.5–7 billion dollars annually. The bulk of this market is the fast-food restaurant business, wherein parfried and frozen potato strips are commonly purchased in bulk from commercial suppliers and stored at freezer temperatures until shortly before serving. At that point, the parfried and frozen potato strips are prepared for eating by deep fat frying in fat or oil.

McDonald's TM french fries, long considered the state-of-the-art in the fast-food industry, apparently are processed according to the process described in U.S. Pat. No. 3,397,993 (Strong). Therein, raw potato strips are blanched by steam or hot water until generally translucent throughout, dehydrated in hot air to cause a weight loss of at least 20 percent, parfried for 30–60 seconds at 375° F. and then frozen to about 0° F. The frozen potato strips are shipped and/or stored until final fry is desired. They are finish fried by immersing in a deep fat or oil bath, usually containing a medium consisting mainly of beef tallow, at a temperature of about 300°–375° F. for 1.5–3.5 minutes.

Another method for preparing french fries for fast food restaurants is taught in U.S. Pat. No. 3,649,305 (Wilder), wherein potato strips are dehydrated to reduce their moisture content by 10–30 percent, blanched, parfried for 30–90 seconds at about 300°–400° F. and then frozen. The frozen strips are then fried in oil for 1.5–3 minutes at 325°–375° F.

More recently, attention has been directed to the use of microwave ovens for preparing frozen french fries. In a microwave oven, high frequency energy is passed through the food product. The power absorption or specific absorption rate for a particular product depends upon a variety of physical and chemical factors, such as frequency, product temperature, the magnitude of the electric field in the product, density and dielectric constants. The high frequency energy excites polar molecules (such as water) contained within the food product and heat is generated as a result.

Various references disclose methods for preparing french fried potato products which can be cooked in microwave ovens.

U.S. Pat. No. 4,456,624 (Glantz et al.) discloses embedding potato pieces in potato strips by high energy impingement which disrupts the surface which has been preheated in water. Thereafter, the strips are blanched and parfried for 5–20 seconds at 340°–380° F. After freezing, the potato strips are either fried or oven baked to complete the process. The patent also states that the potato strips also may be finally cooked in a microwave oven, although no examples are provided.

U.S. Pat. No. 4,590,080 (Pinegar) discloses subjecting potato strips to blanching, parfrying for 50–100 seconds at 360° F., intermediate freezing at −40° F. for 10 minutes, a longer parfrying for 2–4 minutes at 360° F., blast freezing, storing and microwaving.

U.S. Pat. No. 4,109,020 (Gorfien et al.) discloses partially dehydrating frozen parfried potato strips by heating in an air oven or by heating in a combination microwave/air oven and then additionally heating in an air oven, frying in a deep fat fryer for 1 to 3 minutes at 375° F., freezing at −10° F. for 4 hours, storing and microwaving.

Finally, U.S. Pat. No. 4,219,575 (Saunders et al.) discloses a complex sinusoidal strip surface configuration for crinkle cut potatoes which are subjected to frying for 4 minutes at 350° F., and thereafter blast frozen to an internal temperature of 0° F. A two ounce sample of these crinkle-cut potatoes may be reheated in a microwave oven for one minute at 1000 watts.

It is therefore an object of the present invention to provide a french fried product which upon reheating in a microwave oven to a suitable temperature for consumption closely resembles the flavor, aroma, texture, mouthfeel and total eating experience of a deep-fat fried fast food french fry.

It is another object of the present invention to provide a microwaveable french fried potato product which can be microwaved in a convenience store or in the consumer's home in a very short period of time, which is highly palatable and has a crisp exterior and tender interior.

SUMMARY OF THE INVENTION

One aspect of the present invention relates to a process for preparing french fried potatoes suitable for subsequent microwave reheating to obtain a product having a crisp exterior and a tender interior, comprising coating potato strips with toasted potato granules to provide a thin coating of toasted potato granules which adheres on the surface of the potato strips. In preferred embodiments, the potato strips are finish fried to a cooked, ready-to-eat condition prior to this coating.

Another aspect of the present invention relates to a process for preparing french fried potatoes suitable for subsequent reheating to obtain a product having a crisp exterior and a tender interior, comprising blanching potato strips, applying a dust-coating of potato granules to the blanched potato strips to provide a thin coating of potato granules which adheres on the surface of the potato strips, finish frying the dust-coated potato strips to a fully cooked, ready-to-eat condition, and thereafter applying a coating of toasted potato granules on the finish fried potato strips to provide a thin coating of toasted potato granules which adheres on the surface of the potato strips.

Another aspect of the present invention relates to a process for preparing fully cooked potato strips suitable for subsequent reheating to obtain a product having a crisp exterior and tender interior, comprising finish frying potato strips in a continuous fryer. The potato strips are introduced into a three-zone continuous fryer on a conveyor. The first zone of the frying medium is preferably heated to a temperature from about 360° F. to about 380° F. The second zone contains a frying medium preferably heated to a temperature from about 320° F. to about 360° F. The third zone of the continuous fryer contains a frying medium heated to a temperature from about 300° F. to about 360° F. The potato strips which exit the third zone of the continuous fryer are in a fully-cooked, ready-to-eat condition.

Another aspect of the present invention relates to a process for preparing frozen parfried potato strips for finish frying and further freezing to obtain a product having a crisp exterior and tender interior upon subsequent reheating which comprises tempering frozen parfried potato strips by placing them in a controlled environment kept at a temperature from about 35° F. to about 45° F., more preferably from about 36° F. to about 39° F., and a relative humidity from about 75 to about 100 percent. Preferably the potato strips are gently agitated in the controlled environment to enhance exposure of all of the surfaces of the potato strips to the ambient air to maximize equilibration. At the end of the tempering process, the potato strips preferably have an average internal temperature from about 27° F. to about 35° F., and most preferably 27° F. to about 30° F.

Another aspect of the present invention relates to a finish fried potato strip suitable for subsequent microwave reheating substantially without cooking to obtain a product having a crisp exterior and a tender interior having a thin layer of toasted potato granules which adheres on the surface of potato strip.

Another aspect of the present invention relates to a microwave-reheatable finish fried potato strip adapted to substantially withstand moisture migration to the surface of the potato strip and structural damage while frozen, comprising an exterior portion having a first layer comprising potato granules which have been applied to the surface of the potato strip and thereafter deep-fat fried such that the potato granules are substantially integral with the potato strip, and a second layer comprising a coating of toasted potato granules which adhere to the surface of the first layer. The potato strips are suitable for subsequent reheating substantially without cooking in a microwave oven to obtain a product having a crisp exterior and tender interior.

The finish fried potato strips of the present invention may be frozen and stored at freezer temperatures for later reheating in a microwave oven. The microwave-reheated potato product has a color, texture, mouthfeel and taste which closely resembles commercially prepared french fried potatoes which have been prepared by deep-fat frying such as McDonald's TM french fries.

DETAILED DESCRIPTION

The process of the present invention is practiced upon conventional potato strips first by the initial preparation of whole potatoes into strips which may be treated as discussed below. Basically, whole potatoes are washed, peeled and then cut into strips having the desired size and shape. Thereafter, the potato strips are blanched. Blanching has a leaching effect on sugars present in the potato strips and serves to even out the sugar levels throughout the potato strips, which in turn reduces the occurrence of dark or uneven colored finished fries. This is caused mainly by the action of enzymes, which are inactivated in the blanching step. Commercial procedures for washing, peeling, cutting and blanching in the production of french fried potatoes are discussed in "Potato Processing" by William F. Talburt and Ora Smith, Third Edition, 1975, published by the AVI Publishing Company Inc., Westport, Conn. at pages 415-423. In particular, blanching is usually carried out by exposing the raw cut strips to either water or steam for a suitable time and temperature well known in the prior art.

The potato strips which are used in the present invention may be of varying size and shape. However, it is preferred in one embodiment that the relatively thin and elongated potato strips known in the art as "shoestrings" be used. Shoestring potato strips, as the term is used herein, is defined as potato strips which are from about 3/16 to about 5/16 inch square in cross-section and from about 2.5 to about 5 inches in length. Preferred is a shoestring potato strip from about ¼ to about 5/16 inch (per side) square in cross-section and from about 2.5 to about 4.5 inches in length.

In another embodiment of the present invention, it is preferred to use irregularly cut potato strips known in the art as "crinkle-cut" strips. Such strips usually average from about 5/16 to about 7/16 inch square in cross-section and from about 2 to about 3 inches in length. Preferred is a crinkle cut potato strip which is about 5/16 inch square in cross-section Also, straight cut thick fries of about ½ inch square in cross-section and from about 2 to about 5 inches in length may be used.

It is preferred that the potato strips that are to be dust-coated are previously parfried, or parfried and frozen. Such potato strips are widely available in the food industry from various sources, and are made commercially available to fast food restaurants, distributors, etc.

An example of a preferred manner in which the potato strips may be processed prior to dust-coating is taught in U.S. Pat. No. 3,397,993 (Strong), assigned to McDonald's System Inc., and hereby incorporated by reference. Strong teaches that after the strips are washed free of starch by barrel washing, fluming, etc., they are then blanched preferably by steam for about 2-10 minutes until all portions of the strips receive enough heat to turn them into a generally translucent condition throughout. Alternatively, a hot water blanch may be used for about 3-8 minutes at a temperature of about 160°-200° F. The strips are then dehydrated by subjecting them to heated air currents for about 5-20 minutes at a temperature of about 150°-350° F. to reduce their moisture content. Thereafter, the strips are parfried in a deep fat fryer for a short period of time, preferably from about 15 to about 60 seconds at a temperature of from about 300° to about 375° F. The parfrying has the effect of further reducing the moisture content and partially frying the raw potato strips.

The term "parfrying" refers to the partial frying of a potato strip to a degree less than that of a fully cooked or "finish fried" potato strip.

In most instances, the oil used to accomplish the parfrying of the potato strips comprises refined beef tallow, oleo stock or a blend of beef tallow and a lesser amount of one or more vegetable oils, i.e. usually 10-15 percent.

Finally, the strips are frozen, for instance by placing them directly into a freezer, by first cooling the strips and then freezing them to about 0° F., or blast freezing them at a temperature of from about −25° to about −30° F. by the use of freon, etc. The frozen strips are then packaged as desired, stored and/or shipped for further processing.

Although the Strong disclosure is discussed above as an example of the manner in which the potato strips may be treated prior to dust-coating, it is not meant to be exclusive. Many other procedures well-known in the art are also suitable, such as that which is disclosed in U.S. Pat. No. 3,649,305 (Wilder), hereby incorporated by reference.

It is also important to note that other fats and oils in addition to or in the place of beef tallow may be used to parfry the potato strips. For instance, partially hydrogenated cottonseed oil, soybean, palm, sunflower, safflower, canola, coconut, peanut oils and the like, or combinations thereof can also be used. Additionally, it is envisioned that reduced-calorie or a calorie-less fat, or fat substitutes such as Olestra TM, from the Procter and Gamble Co., would also be useful in parfrying and/or finish frying.

The potato strips may be further pretreated prior to freezing according to conventional methods known in the art. For instance, the potato strips may be treated with sodium acid pyrophosphate (SAPP), a chelating agent used to prevent discoloration of the strips. Dextrose (corn sugar) may be used in order to provide a golden color upon frying. Sulfur dioxide may be used to inhibit browning. Other pretreatments known in the art may also be used.

The parfried and frozen potato strips generally have a moisture content of about 60–70 percent, a fat content of from about 4 to about 7 percent by weight, and a potato solids content of from about 23 to about 36 percent by weight of the potato strip.

In another embodiment of the present invention, raw unpeeled white potatoes are obtained for processing. Usually, raw white potatoes have a moisture content of about 75–85 percent by weight. Although any variety of potato would be useful to practice the present invention, Russet Burbank or Katahdin potatoes are examples of preferred potatoes. The potatoes are washed, peeled, trimmed, sorted, cut, blanched, and optionally pretreated in any conventional manner or as detailed in the above-mentioned Potato Processing reference. Thereafter, the potato strips are preferably dust-coated. In another embodiment of the present invention, the tempered potato strips are finish fried without the application of the above-mentioned dust-coating.

By a further teaching of the present invention, potato strips are prepared as disclosed in pending applications U.S. Ser. Nos. 017,140 filed Feb. 20, 1987, now abandoned, and continuation-in-part application U.S. Ser. No. 108,722, filed Oct. 14, 1987, now U.S. Pat. No. 4,959,240, and then dust-coated and otherwise treated in accordance with the present invention to render a superior engineered or simulated french fried potato product.

If the potato strips have been parfried and frozen, it is preferred that they are thawed to an internal temperature from about 27° F. to about 35° F., more preferably from about 27° F. to about 30° F., prior to further treatment. The potato strips may be thawed according to any process known in the art which substantially avoids desiccation and/or structural damage of the potato strips. However, it is especially preferred that the frozen parfried potato strips be tempered according to the process of the present invention.

More particularly, it has been found that the frozen parfried potato strips can be quickly warmed from their frozen internal temperature from about 0° F. to about −15° F. to an internal temperature from about 27° F. to about 35° F. by tempering the frozen parfried potato strips in a controlled environment kept at a temperature from about 35° F. to about 45° F., more preferably from about 36° F. to about 39° F., and a relative humidity from about 75 to about 100 percent. Clean air is preferably circulated through the controlled environment, with the air velocity being kept to a minimal level. Preferably, the air velocity within the controlled environment is from about 0 to about 200 feet/minute, and most preferably less than about 100 feet/minute. Once the potato strips are tempered, they may be dust-coated with potato granules and then finish-fried.

It has been found that the time period necessary to temper the frozen parfried potato strips can be greatly decreased by gently agitating the frozen parfried potato strips in the controlled environment to enhance exposure of all of the surfaces of the potato strips to the ambient air within the controlled environment. The agitation may be accomplished by any means known in the art.

In a preferred embodiment, the frozen parfried potato strips are agitated by placing them on a plurality of conveyors which are adapted to tumble the potato strips from conveyor to conveyor. Tumbling the potato strips in this manner enhances exposure of all of the surfaces of the potato strips to the ambient air within the controlled environment, thereby more evenly and more quickly equilibrating the internal temperature of all of the potato strips to the desired level.

Desirably, the tempering process described above is adapted to produce temperature-equilibrated potato strips ready for further processing in about 1–2 hours or less in a manner such that the thawed potato strips are substantially structurally intact and have not been subjected to any substantial amount of desiccation.

Most preferably, the controlled environment is a substantially enclosed room in which the potato strips are tempered at a temperature of about 38° F., a relative humidity of about 85 to about 100 percent, and an air velocity of less than 100 feet/minute. The potato strips are preferably conveyed directly from a freezer or cold room at a temperature of about −10° F. and carried via a bucket conveyor to the uppermost conveyor in a plurality of vertically stacked conveyors. The potato strips are moved in a horizontal direction from one end of the uppermost conveyor belt to an opposite end. The layer of potato strips on the conveyor belts is preferably about five inches thick or less. When the potato strips reach the opposite end of the uppermost conveyor belt, they tumble onto a second conveyor belt oriented below the first conveyor. The second conveyor belt conveys the potato strips in an opposite horizontal direction relative to the uppermost conveyor belt. When the potato strips reach an opposite end of the second conveyor belt, they tumble downward onto a third conveyor belt which conveys the potato strips in an opposite horizontal direction relative to the second conveyor belt, and so on. The process continues until the potato strips reach the desired temperature, most preferably about 29° F. to about 35° F.

In the case of stop-product situation, the conveyors may be stopped at any point during the process. It is also possible, if the stop-product situation continues for any extended period of time, to decrease the temperature of the air within the controlled environment to substantially stop continued thawing of the potato strips. The number and length of the vertically stacked conveyors, the size of the controlled environment, the speed at which the conveyors move the potato strips, etc., determine the amount of potato strips processed within a given period of time.

The thawed potato strips are then transported from the tempering room, e.g. via a conveyor belt, to be finish fried.

In one preferred embodiment, the thawed potato strips are dust-coated with potato granules prior to finish frying to provide a thin coating of the potato granules which adheres on the surface of the potato strips. The term "potato granules" is defined for purposes of the present invention as comprising any granular product which has been derived from potato products, such as finely ground potatoes, potato flour, dehydrated potato, potato flakes, potato starch, etc., or a mixture of any of the above. All of the above-mentioned granular products are available commercially from any number of sources.

The dust-coating of the potato strips can be carried out in any conventionally known manner. For instance, the potato strips are placed onto a conveyor belt with vibration action and potato granules are sprinkled onto the potato strips from above. Thereafter the excess potato granules are removed via the vibratory action. A thin, even coating of potato granules is thereby accomplished.

It is preferred that when shoestring potato strips are used, the dust-coating comprise at least 50 percent potato granules, and in the most preferred embodiments, the dust-coating is comprised only of potato granules and preferably finely ground potatoes.

On the other hand, it is preferred that the dust-coating for crinkle-cut potato strips comprise at least 50 percent potato flour, and in the most preferred embodiments, the dust-coating is comprised only of potato flour.

The dust-coating should produce a coating indistinguishable from the surface appearance of a conventional french fried potato. The term "conventional french fried potato" is defined herein as a deep fat fried potato strip having a crisp, golden exterior and a tender interior, such as the McDonald's TM french fry. Due to the use of fine granules, it is possible to obtain a dust-coated product which is both smooth and which provides a uniform appearance. In this regard, a dusting powder having 90-95% of its granules through U.S. 40 mesh and which includes no more than 8 percent moisture is preferred, such as that which is available from Basic American Foods Company. A cross-sectional view (perpendicular to the long axis of shoestring potato strip), shows that the dust-coating blends imperceptively into the potato strip as part of a crisp layer formed during finish frying.

Any number of processes are known in the art for the preparation of potato granules which may be used satisfactorily in the present invention. One such process is the "add-back" process, in which cooked potatoes are partially dried by "adding back" enough previously dried granules to give a "moist mix" which can be granulated into a fine powder after holding, as described in more detail in "Potato Processing" by Talburt and Smith.

The dust-coated potato strips according to the present invention will have a layer of potato granules sufficient to cover the potato strips and provide a coherent coating. The dust-coating preferably comprises from about 0.3 to about 1.5 percent or as much as 5 percent by weight of the potato strip. In more preferred embodiments, the dust-coating comprises from about 0.2 to about 0.5 percent by weight of the potato strip, and it is most preferred that the dust-coating comprise about 0.3 percent by weight of the potato strip.

The potato flour used for dust-coating is preferably fine flour having a fine particle size which produces a coating indistinguishable from the surface appearance of a conventional french fried potato. An especially preferred potato flour for use in the present invention is a pure, fine potato flour packed by Lamb-Weston. The potato flour may be made by any method known in the art, such as those processes discussed in the above-mentioned publication on "Potato Processing" by Talburt and Smith.

Preferably, crinkle-cut potato strips will have a coating which comprises from about 0.3 to about 5 percent by weight of the potato strip. In preferred embodiments, the dust-coating comprises from about 2 to about 3 percent by weight of the potato strip, and most preferred is a dust-coating of about 2.5 percent.

Although the potato strips may be dust-coated and thereafter placed in a frying medium while still frozen, it is preferable to temper the potato strips before frying.

In one embodiment of the present invention, the dust-coating step is omitted when the potato strips are coated with toasted potato granules after finish frying.

The parfried potato strips are then finish fried after tempering with or without an intermediate dust-coating step. The frying medium is preferably a vegetable shortening or fat, although beef tallow, a blend of beef tallow and one or more vegetable oils, etc. can also be used. In preferred embodiments of the present invention, however, the frying medium is a vegetable shortening which mimics the physical properties, and mouth-feel of beef tallow. A partially hydrogenated vegetable oil with melting and mouthfeel characteristics which approximate those of beef tallow, and has a Wiley melting point of from about 95° to about 99° F., a solid fat index at 50° F. of from about 34 to about 43 and a solid fat index at 92° F. of from about 3 to about 8 is most preferred. An example of a commercially available product having such characteristics is Van den Bergh's Code #321.

The temperature of the frying medium before the parfried potato strips are added is approximately 370-375° F. This temperature is depressed (to approximately 340° F.) when the potato strips are added and then rises to about 360° F. during the course of frying. The potato strips are fried in this medium from about 3 to about 5 minutes. Preferably, shoestring potato strips are fried for about 3 to about 4 minutes, while crinkle-cut potato strips are fried for about 4.5 to about 5 minutes. In a continuous process, the temperature profile of the frying medium is preferably from about 380° to about 300° F.

The frying temperature and time are inversely proportional and are adjusted to cook the potato strips in a short period of time to provide a product having a crisp exterior and a tender interior. It is preferred that the finish frying step occur promptly after dust-coating.

In a preferred embodiment for commercial production, the potato strips are introduced into a first end of a continuous fryer and conveyed through the continuous fryer to an opposite end. The potato strips which exit the opposite end of the continuous fryer are in a fully cooked, ready-to-eat condition. Preferably, the potato strips are introduced via a conveyor into a three-zoned continuous fryer having a frying medium with a temperature profile of about 380° F. at the entrance of the continuous fryer to about 300° F. at the exit. Preferably, the frying medium in zone 1 is heated to a temperature from about 360° F. to about 380° F.; the frying medium in zone 2 is heated to a temperature from about 320° F. to about 360° F.; and the frying medium in zone 3 is heated to a temperature from about 300° F. to about 340° F. The finish-fried potato strips which exit from the opposite end of the continuous fryer preferably have an internal temperature from about 190° F. to about 220° F.

In a most preferred embodiment for commercial production, the continuous fryer comprises a plurality of zones in which the frying medium circulates. The temperature of the frying medium in each zone may be individually adjusted by the operator as desired to optimize the product. In this embodiment, the continuous fryer has three zones from the entrance of the continuous fryer to the exit. The frying medium in zone 1 is heated to about 365° F., the frying medium in zone 2 is heated to about 340° F., the frying medium in zone 3 is heated to about 320° F. The potato strips preferably pass through each zone in about one minute.

Preferably, the frying medium is transferred from a storage area and introduced into a plurality of heat exchangers where it is heated to the desired temperature and filtered to remove impurities. The heated frying medium circulates into the desired zone of the continuous fryer. The used oil may then be recirculated.

In contrast to traditional continuous fryers, the continuous fryer of the present invention does not use baffles to segregate one zone from another; rather the frying medium is free-flowing, and the inlet and outlet ports are distributed such that a temperature differential between the zones can be maintained. The temperature differentials may be measured, e.g., via thermocouples. The oil in the given zones is circulated through independent pumps into independent heat exchangers which creates zone heating across the fryer.

The time necessary to finish fry the potato strips in the continuous fryer may be manipulated, for example, by manipulating the temperature of the frying medium, the dwell time, the pounds of potato strips per cubic foot introduced into the continuous fryer, etc.

The finish fried potato strips which leave the opposite end of the continuous fryer are then preferably transported on a perforated inclined belt or the like (e.g., at a 45° upward angle) such that excess frying medium is allowed to drain from the surface of the potato strips via gravity.

When the potato strips are shoestring potatoes, it is preferred that they are finish-fried to a moisture content from about 30 to about 46 percent, a fat content from about 14 to about 25 percent, and a potato solids content from about 35 to about 63 percent. Most preferably, the potato strips are finish-fried to a moisture content from about 36 to about 43 percent and a fat content from about 15 to about 18 percent, by weight.

The potato strips are then preferably coated with toasted potato granules. The term "toasted potato granules" includes toasted finely ground potato, toasted potato flakes, toasted dehydrated potato, and the like. The potato granules may be toasted by any means known in the art. The toasted potato granules used in the present invention have a moisture content from about 0.1 to about 4 percent. In one embodiment, this moisture content may be achieved by toasting the potato granules in a convection oven kept at a temperature of about 300° F. for about 45 minutes.

Preferably, the coating of toasted potato granules which adheres to the potato strips is from about 0.2 to about 0.4 percent by weight of the potato strip, and most preferably about 0.3 percent by weight of the potato strip.

In a further preferred embodiment, the finish fried potato strips are further coated with a layer of fat-encapsulated salt. The coating of fat-encapsulated salt is preferably from about 0.8 to about 1.2 percent by weight of the potato strip, and most preferably about 1.0 percent. Preferably, the fat-encapsulated salt has a salt content from about 35 to about 65 percent by weight and the fat has a melting point from about 140° F. to about 160° F. An example of a suitable fat encapsulated salt is Van den Bergh's Durkote sodium chloride 150-65 VS, which would preferably be applied as a 0.8 percent coating. The fat-encapsulated salt is preferably applied concurrently with the dust-coating of toasted potato granules. Optionally, finely ground salt in an amount from about 0.2 to about 0.6 percent, and more preferably 0.4 percent by weight, may be applied in substitution of the fat-encapsulated salt.

Then the potato strips are preferably promptly frozen. By "promptly frozen", it is meant that the finish fried potato strips are drained of excess oil and allowed to cool to a temperature of from about 100° F. to about 150° F., and most preferably to about 160° F. before freezing. In most circumstances, the cooling period will be from about 1 to about 5 minutes in order to reach the aforementioned temperatures.

In contrast to the conventional freezing methods which are utilized in the prior art whereby cold air from freon coils, etc. is blown directly onto the potato strips by a fan resulting in significant (e.g. 10%) surface desiccation and dehydration, in the present invention the potato strips preferably are frozen in a manner which substantially avoids desiccation and thus structural damage. For example, the potato strips may be carefully frozen at a temperature of about −20 F. to about −70° F. for about 10 to about 20 minutes, until the internal temperature of the potato strips is about −10° F. Prompt freezing in this manner preserves the flavor and aroma present in the finish fried potato strips, and also preserves the structural integrity of the same. Slow freezing appears to cause a significantly greater percentage of the potato strips to have a collapsed structure upon reheating.

In a preferred embodiment, the potato strips are frozen in a tunnel cooled by liquid nitrogen without direct exposure to high fan velocities. More particularly, the liquid nitrogen comes out of a tank and into a freezing tunnel and is circulated in the vapor form. The potato strips pass through the freezing tunnel on a multi-conveyor belt system and are frozen by the liquid nitrogen vapor, which is gently circulated via one or more fans located above the conveyor belt. It is important to note that a freezing blast is preferably not directly applied to the potato strips; rather, there is a gentle flow over the potato strips so as not to cause unnecessary dehydration and also so as not to damage the surface.

It is especially preferred that the freezing tunnel includes a plurality of zones which expose the potato strips to liquid nitrogen vapor at a temperature from about −30° to about −70° F., the temperature of the liquid nitrogen vapor gradually increasing from a first end where the finish-fried potato strips enter to an opposite end where the frozen potato strips exit. The temperature within each zone may be individually adjusted by the operator as desired to optimize the product.

Most preferably, the freezing tunnel includes three zones, a first zone corresponding to the first end of the freezing tunnel in which the potato strips are exposed to liquid nitrogen vapor at a temperature from about −55° F. to about −65° F., a second zone corresponding to the center of the freezing tunnel in which the potato strips are exposed to liquid nitrogen vapor at a temperature from about −40° F. to about −50° F.; and a third zone corresponding to the opposite end of the tunnel in which the potato strips are exposed to liquid nitrogen vapor at a temperature from about −25° F. to about −35° F. The potato strips which exit the opposite end of the freezing tunnel preferably have an internal temperature from about −20° F. to about −30° F. and most preferably about −25 F. The freezing process is conducted, for example, for about 5-10 minutes. The potato strips are preferably conveyed through each zone in about 3 minutes.

The freezing of the potato strips in this manner produces a frozen product without any substantial desiccation and without freezer burn. The internal ice crystals which are formed during the freezing process are as small as possible so as to cause minimal structural damage.

Alternatively, any other manner known in the art to accomplish a continuous, gradual freezing of the potato strips to the above-mentioned temperatures without the formation of large ice crystals and without significant structural damage to the potato strips may be used.

The frozen potato strips are then packed into tightly sealed packages and stored at normal freezer temperatures of approximately 0° to about −20° F. The containers may contain a large amount of the potato strips, i.e. a few pounds, or may be designed to hold a suitable single serving size, e.g. about 64 grams or 2.25 ounces. Preferably, the potato strips are conveyed from the freezing tunnel to a packaging area via a conveyor belt in a controlled environment kept at a temperature from about −20° F. to about 0° F., and the package is purged with a blast of liquid nitrogen vapor prior to filling with the frozen potato strips.

It is especially preferred that the potato strips are not exposed to a temperature above about 0° F. after being frozen in the freezing tunnel and being packaged.

The frozen packaged product may be removed from a freezer and reheated in a short period of time such that the potato strips attain a suitable consumption temperature in a microwave oven. The potato strips may be reheated in microwaveable packaging, paper plates, microwave-safe dishes, etc.

Since the potato strips have preferably been fully cooked during the finish frying step, the reheating step is adapted to substantially only reheat the strip to a suitable consumption temperature without any substantial change in the composition of the potato strips. A suitable consumption temperature is preferably from about 130° F. to about 170° F.

If the microwave oven is one which is conventionally available to consumers for home use, a 64 gram serving of the potato strips may be reheated at high power (e.g. 600–700 watts) for approximately two minutes. The reheating time is, of course, dependent upon the oven wattage used and the amount of potato strips to be reheated. Thus, if a larger quantity, i.e. multiple servings, of potato strips are reheated in the microwave oven, or if a power of 600–700 watts is not achieved, a longer microwave period may be necessary.

If the microwave oven is one which is conventionally used in a fast-food restaurant or a convenience store, the microwave power setting may be set at approximately 1000–1400 watts. The time period for reheating the potato strips is shortened accordingly, i.e. approximately 45 seconds at 1400 watts for a 64 gram serving of the potato strips.

The reheated potato strips may be eaten immediately. On the other hand, the reheated potato strips may be allowed to cool for about 30–60 seconds. The product is then on the average from about 160° to about 170° F. and ready to serve. The potato strips are crisp on the outside, tender on the inside, golden in color, and closely resemble the flavor, aroma, texture and total eating experience of McDonald's TM french fries.

The ready-to-eat potato strips may be kept at an acceptable temperature for consumption (i.e. 140°–155° F.) via the use of a food warming device such as a commercially available heat lamp. The potato strips can be maintained at such temperatures for an extended period of time without becoming soggy, limp or suffering structural damage.

The composition of the reheated, ready-to-serve shoestring french fried potato products of the present invention preferably includes from about 30 to about 46 percent moisture, from about 14 to about 20 percent fat, and from about 35 to about 63 percent potato solids.

If the potato strips are crinkle-cut or steak fries, the moisture and fat content is adjusted upwardly. Depending upon the dimensions of the potato strip, a finish fried crinkle-cut product may include, for example, from about 30 to about 50 percent moisture and from about 13 to about 22 percent fat. The density of the finish fried crinkle-cut potato strip is from about 0.4 to about 0.6 g/ml.

In an alternative embodiment of the present invention, the final freezing step (after finish frying) may be omitted if shipping and/or storage is not necessary. In this embodiment, the potato strips are allowed to cool at room temperature or are refrigerated after finish frying and thereafter a serving portion is simply reheated as detailed above when desired. After reheating, the product has characteristics which were described above.

EXAMPLES

The following examples illustrate various aspects of the present invention. They are not intended to limit the claims.

EXAMPLE 1

Conventional frozen potato strips made available to fast food restaurants are obtained and divided into portions for subsequent processing. One skilled in the art will appreciate that such conventional frozen potato strips are derived from whole potatoes which have been peeled, cut, possibly treated with one or more of the chemicals discussed previously, and either water or steam blanched. These potato strips are thereafter par-fried for approximately 30–60 seconds at about 375° F. and frozen. The potato strips are packaged and stored at freezer temperatures.

The frozen potato strips are distributed onto a conveyor belt which transfers the potato strips into a tempering room having a temperature of about 38° F., a room relative humidity of about 85 to about 100 percent, and a room air velocity of less than about 100 feet/minute. The potato strips are transferred to the top of a series of vertically stacked conveyors which move the potato strips in a horizontal direction from one end of a conveyor to an opposite end, where the potato strips tumble onto a second conveyor belt disposed below the uppermost conveyor. The process continues until the potato strips are tumbled onto the last (bottom) conveyor, which in turn transfers the potato strips for further processing. The tempering process takes about 1.25 hours. The potato strips have an internal temperature at the time they leave the tempering room of about 29° F. to about 30° F.

The tempered potato strips are then transferred to a tumble drum, where they are dust-coated with potato granules (U.S. 40 mesh/ground potato). The dust-coating of the potato granules comprises about 0.3 percent by weight of the potato strip.

The dust-coated potato strips are then promptly conveyed into a continuous fryer having three temperature zones. The frying medium used is Van den Bergh's Code #321. The oil level within the fryer without product is preferably about 8-9 inches. When product is added, the oil level within the continuous fryer preferably rises to about 9-10 inches. The temperature of the frying medium in the first zone to which the dust-coated potato strips are exposed is approximately 365° F. The temperature of the frying medium in the second zone is about 340° F. The temperature of the frying medium in the third zone is about 320° F. The potato strips are conveyed through the continuous fryer such that the potato strips are cooked within each zone for about one minute. The internal temperature of the potato strips leaving the continuous fryer is about 190°-220° F.

Thereafter, the potato strips are removed from the continuous fryer and conveyed at an upward angle of about 45° so that excess oil is allowed to drain from their surface.

The potato strips of Example 1, which now have an internal temperature of about 160° F., are then promptly conveyed into a freezing tunnel. The potato strips are initially exposed to liquid nitrogen vapor at a temperature of about −60° F. in first end of the freezing tunnel. The potato strips are subsequently conveyed through a second (central) zone in which the potato strips are exposed to liquid nitrogen vapor at a temperature of about −45° F., and finally through a third zone at the opposite end of the tunnel where the potato strips are exposed to liquid nitrogen vapor at a temperature of about −30° F. The potato strips are exposed to each zone for about 3 minutes. The potato strips which exit the freezing tunnel have an internal temperature of about −25° F.

The potato strips of Examples 1 and 2 are then promptly conveyed in a controlled environment kept at about −15° F. to about −20° F. and packaged, and are stored at freezer temperatures.

A 64 gram portion of Example 1 is then removed from the freezer after 24 hours and reheated in a conventional microwave oven (700 watts) at a power setting of high for two minutes.

The french fried potato product of each of the reheated samples of Example 1 has a crisp, golden exterior and a fluffy, light interior. The french fried potato product also has an aroma, flavor, mouthfeel and total eating experience closely resembling that attained by the conventional state of the art commercially available deep fat fried fast-food product, i.e. McDonald's TM french fries. Because the potato strips puffed slightly during reheating, the 64 gram (2.25 ounce) serving appears as large as an 85 gram or 3 ounce serving of french fries obtained from a fast-food restaurant.

EXAMPLE 2

After the potato strips of Example 1 are stored for 7-28 days at freezer temperatures, additional 64 gram portions are removed from the freezer and separately reheated as detailed above. The french fried potato product of Example 2 after freezing for 7-28 days is similar to that of Example 1 (after 24 hours of freezing).

EXAMPLE 3

Example 3 is prepared in identical fashion as Example 1 with the exception that after the potato strips exit the continuous fryer, they are conveyed to a second tumble drum before freezing. At the second tumble drum, the potato strips are coated with 0.3 percent toasted potato granules (U.S. 40 mesh/ground potato; moisture content about 2-3 percent by weight of the potato granules), by weight of the potato strips. Thereafter, the potato strips (which now have an internal temperature of about 160° F.) are conveyed to the freezing tunnel and treated as per Example 1.

After storing at freezer temperatures for 24 hours, a 64 gram portion of Example 3 is removed from the freezer and reheated in a conventional microwave oven (700 watts) at a power setting of high for two minutes. The reheated portion is then allowed to cool for approximately 30 seconds, at which time it is ready to serve.

The reheated product of Example 3 is virtually identical to the reheated product of Example 1.

EXAMPLE 4

After the potato steps of Example 3 are stored for 7-28 days at freezer temperatures, additional 64 gram portions are removed from the freezer and separately reheated as detailed above. After 7-28 days, the reheated potato strips of Example 3 are noticeably crisper as compared to the similarly treated potato strips of Example 1.

EXAMPLES 5-6

Example 5 is prepared in identical fashion as Example 3 with the exception that after finish frying, the potato strips are coated in the second tumble drum with 0.3 percent by weight toasted potato granules and about 0.8 percent by weight fat-encapsulated salt granules (Van den Bergh's Durkote sodium chloride 150-65 VS). The reheated potato strips have a noticeable salt flavoring and have substantially the same texture as the potato strips of Example 3.

Example 6 is prepared in identical fashion as Example 3, except that the intermediate dust-coating step is omitted. The tempered potato strips are conveyed directly to the continuous fryer. The reheated samples of Example 6 are highly palatable but less crispy than those of Example 5, and represent an improvement over the prior art.

EXAMPLES 7-9

In Examples 7-9, whole raw potatoes are washed, peeled, cut into shoestring potato strips, blanched in water for 15 minutes, and air dried.

The potato strips of Example 7 are then parfried in Van den Bergh's Code #321 for one minute at 375° F. Thereafter, the parfried potato strips are otherwise treated as set forth in Example 3 above, omitting the intermediate freezing and tempering steps (prior to dust-coating and finish frying). In Example 8, the potato strips are treated similarly to the potato strips of Example 3, except that the parfrying step is omitted. Instead, the dust-coated potato strips are fried in the continuous fryer for a comparatively longer period of time, such that the potato strips leaving the continuous fryer are in a fully cooked, ready-to-eat condition. In Example 9, the potato strips are treated similarly to Example 3, except that the dust-coating step is omitted. After blanching and air drying, the potato strips are finish-fried in the continuous fryer, coated with toasted potato granules, and frozen.

The reheated potato strips of Examples 7–9 are highly palatable and represent an improvement over the prior art.

The examples provided above are not meant to be exclusive. Many other variations of the present invention would be obvious to those skilled in the art, and are contemplated to be within the scope of the appended claims.

We claim:

1. A process for preparing french fried potatoes suitable for subsequent reheating in a microwave oven to obtain a product having a crisp exterior and a tender interior, comprising
    finish frying potato strips, and thereafter
    coating said potato strips with toasted potato granules to provide a thin coherent coating of said potato granules on said potato strips, and
    coating said finish fried potato strips with from about 0.8 to about 1.2 percent by weight fat-encapsulated salt.

2. The process of claim 1, wherein said fat-encapsulated salt comprises from about 35 to about 50 percent salt, said fat having a melting point from about 145° F. to about 155° F.

3. The product of claim 1.

4. A process for preparing french fried potatoes subsequent reheating in a microwave oven to obtain a product having a crisp exterior and a tender interior, comprising
    blanching potato strips,
    applying a dust-coating of potato granules to said blanched potato strips to provide a thin coherent coating of said potato granules on said potato strips,
    finish frying said dust-coated potato strips to a fully-cooked, ready-to-eat condition, and thereafter
    applying a coating of toasted potato granules on said finish fried potato strips to provide a thin coherent coating of said toasted potato granules on said potato strips.

5. The process of claim 4, further comprising
    parfrying said potato strips after said blanching step,
    freezing said parfried potato strips, and
    tempering said frozen potato strips in a controlled environment kept at a temperature from about 36° F. to about 39° F. and a relative humidity from about 75 to about 100 percent until said potato strips attain an average internal temperature from about 27° F. to about 30° F. prior to said dust-coating.

6. The process of claim 5, further comprising periodically and gently agitating said potato strips within said controlled environment.

7. The process of claim 5, wherein said toasted potato granules have a moisture content from about 0.1 to about 4 percent by weight of said toasted potato granules.

8. The process of claim 6, wherein said potato strips are agitated by placing said potato strips on a plurality of vertically stacked conveyors in said controlled environment, said conveyors being adapted to tumble said potato strips such that all of the surfaces of said potato strips are substantially evenly exposed to said controlled environment.

9. The process of claim 4, further comprising finish frying said potato strips in a three-zone continuous fryer, said potato strips being introduced into a first zone in a first end of said fryer in which the frying medium is heated to a temperature from about 360° F. to about 380° F., said potato strips passing through said first zone and into a second zone in which the frying medium is heated to a temperature from about 320° F. to about 360° F., said potato strips passing through said second zone to a third zone at an opposite end of said fryer in which the frying medium is heated to a temperature from about 300° F. to about 340° F., the potato strips which exit said opposite end being in a fully cooked, ready-to-eat condition.

10. The process of claim 4, wherein said dust-coating of potato granules comprises from about 0.1 to about 0.4 percent of said potato strips by weight.

11. The process of claim 4, wherein said coating of toasted potato granules applied comprises from about 0.2 to about 0.5 percent of said potato strips by weight.

12. The process of claim 4, wherein said toasted potato granules have moisture content from about 1.0 to about 3.0 percent by weight.

13. The process of claim 4, further comprising coating said finish fried potato strips with from about 0.8 to about 1.2 percent by weight fat-encapsulated salt.

14. The product of claim 13.

15. A process for preparing potato strips which have previously been cut, blanched, parfried and frozen for subsequent reheating in a microwave oven to obtain a french fried potato product having a crisp exterior and a tender interior, comprising
    tempering said frozen potato strips by placing them in a controlled environment kept at a temperature from about 36° F. to about 39° F. and a relative humidity from about 75 to about 100 percent and agitating said potato strips within said controlled environment until said potato strips attain an average internal temperature from about 27° F. to about 30° F.,
    dust-coating said tempered potato strips with a thin coating of potato granules which adheres to the surface of said potato strips,
    finish frying said dust-coated potato strips in a three-zone continuous fryer, said potato strips being introduced into a first zone in a first end of said fryer in which the frying medium is heated to a temperature from about 360° F. to about 380° F., said potato strips passing through said first zone into a second zone in which the frying medium is heated to a temperature from about 320° F. to about 360° F., said potato strips passing through said second zone and into a third zone in an opposite end of said fryer in which the frying medium is heated to a temperature from about 300° F. to about 340° F., the potato strips which exit said opposite end being in a fully cooked, ready-to-eat condition, coating said finish fried potato strips with a thin coating of toasted potato granules which adhere to the surface of said potato strips, and thereafter freezing said potato strips in a tunnel cooled by a gentle flow of liquid nitrogen vapor, the potato strips passing through a first end of said tunnel cooled to a temperature from about −55° F. to about −65° F., said potato strips passing from said first end to a central portion of said tunnel cooled by said liquid nitrogen vapor to a temperature from about −40° F. to about −50° F., said potato strips passing from said central portion to an opposite end of said tunnel cooled to a temperature from about −25° F. to about −35° F., said potato strips leaving said tunnel with an average internal temperature from about −10° F. to about −30° F.

16. A finish fried potato strip suitable for subsequent reheating in a microwave oven substantially without cooking to obtain a product having a crisp exterior and a tender interior, comprising a first layer comprising potato granules which have been applied to the surface of said potato strip and thereafter deep-fat fried such that said potato granules are substantially integral with the potato strip, and a second layer comprising a coating of toasted potato granules and a coating of from about 0.8 to about 1.2 percent by weight of fat-encapsulated salt which adhere to the surface of said first layer, said potato strip being adapted for subsequent reheating substantially without cooking to obtain a product having a crisp exterior and tender interior.

17. The potato strip of claim 16, wherein said coating of toasted potato granules comprises from about 0.2 to about 0.5 percent by weight of said potato strip.

18. The potato strip of claim 16, wherein said toasted potato granules have a moisture content from about 1.0 to about 3.0 percent by weight of said toasted potato granules.

19. The potato strip of claim 16, wherein said fat-encapsulated salt has a content from about 35 to about 50 percent by weight and said fat has a melting point from about 145° F. to about 155° F.

20. The product of claim 16 which is frozen.

21. A finish fried potato product suitable for subsequent reheating in a microwave oven substantially without cooking, comprising an outer coating of toasted potato granules and fat-encapsulated salt which adheres to the surface of said potato product, said fat-encapsulated salt being in a sufficient amount to impart a desirable salty taste and flavor to said potato product.

* * * * *